United States Patent
Paul et al.

(10) Patent No.: US 7,843,822 B1
(45) Date of Patent: Nov. 30, 2010

(54) COGNITIVE ADAPTIVE NETWORK MANAGEMENT AREAS

(75) Inventors: Lizy Paul, Cedar Rapids, IA (US); Bruce S. Kloster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 375 days.

(21) Appl. No.: 11/805,666

(22) Filed: May 24, 2007

(51) Int. Cl.
*H04L 12/26* (2006.01)

(52) U.S. Cl. .................... 370/230; 370/254; 370/310.2; 370/328; 455/67.11; 455/69

(58) Field of Classification Search .................. 370/229, 370/230, 230.1, 235, 249, 254, 310.2, 311, 370/328; 455/404.2, 414.2, 423, 456.1, 67.11, 455/69, 115.1, 126
See application file for complete search history.

(56) References Cited

U.S. PATENT DOCUMENTS

| | | | |
|---|---|---|---|
| 5,459,761 A | 10/1995 | Monica et al. | |
| 5,831,545 A * | 11/1998 | Murray et al. | 340/7.27 |
| 5,845,211 A | 12/1998 | Roach, Jr. | |
| 5,953,319 A | 9/1999 | Dutta et al. | |
| 6,151,309 A | 11/2000 | Busuioc et al. | |
| 6,163,701 A | 12/2000 | Salch et al. | |
| 6,415,151 B1 | 7/2002 | Kreppel | |
| 6,459,881 B1 | 10/2002 | Hoder et al. | |
| 6,639,898 B1 | 10/2003 | Dutta et al. | |
| 6,678,245 B1 * | 1/2004 | Cooper et al. | 370/230 |
| 6,978,126 B1 * | 12/2005 | Blaker et al. | 455/352 |
| 7,043,245 B2 | 5/2006 | Dokko | |
| 7,130,579 B1 * | 10/2006 | Rael et al. | 455/20 |
| 7,142,523 B1 * | 11/2006 | Chekuri et al. | 370/328 |
| 7,184,777 B2 | 2/2007 | Diener et al. | |
| 2003/0035468 A1 * | 2/2003 | Corbaton et al. | 375/148 |
| 2006/0148414 A1 * | 7/2006 | Tee et al. | 455/69 |
| 2008/0207149 A1 * | 8/2008 | Unkefer et al. | 455/115.3 |
| 2008/0227404 A1 * | 9/2008 | Harel et al. | 455/69 |
| 2008/0299923 A1 * | 12/2008 | O'Brien et al. | 455/127.1 |
| 2009/0054018 A1 * | 2/2009 | Waheed et al. | 455/126 |
| 2009/0180392 A1 * | 7/2009 | Greiner et al. | 370/252 |

\* cited by examiner

*Primary Examiner*—Kwang B Yao
*Assistant Examiner*—Nguyen Ngo
(74) *Attorney, Agent, or Firm*—Matthew J. Evans; Daniel M. Barbieri

(57) ABSTRACT

A radio network management system, having at least one centralized node is described. The at least one centralized node includes a radio transceiver having more than one adjustable parameter. The centralized node also includes at least one adaptive tuning engine configured to make changes to the at least one adjustable parameter. A weighted analysis function is configured to provide a weighted analysis based on the output of the at least one adaptive tuning engine. Further, a cognitive learning function is configured to provide feedback to make optimally directed adjustments to the at least one adaptive tuning engine.

12 Claims, 6 Drawing Sheets

COGNITIVE ADAPTIVE NETWORK MANAGEMENT AREAS

BACKGROUND

Conventional military networks are mobile ad hoc wireless networks. In these networks every node acts as a route and can route traffic to other nodes. Such networks pose stringent requirements for security and reliability. They are highly dynamic in nature because mobile ad hoc networks are formed over wireless links. Links are susceptible to failures because of the mobility of nodes, or loss of connectivity due to the volatility of wireless links. Strict requirements on security and reliability combined with the dynamic nature of the network provide a strong motivation for self-forming, self-configuring, and self-healing capabilities in the network.

Because of the mobility and power constraints, wireless communication nodes have made the task of ad-hoc network management very difficult. Current research is focused on auto-network management and policy based network management. One major disadvantage of both auto-network management and policy based network management is that every node can have only a limited view of the network and has to work within the limitations of its view. For example, FIG. 1 depicts a nodal communication network 100 in which each node 110 can talk to or can have information about its neighboring node(s), depicted by the connection lines between the nodes 110. This limited view of network management shows an improvement over no network management but there are still areas of centralized ad-hoc network management that may be significantly improved when compared with both auto-network management and policy based network management due to its network wide view.

Thus, there is a need for network management schemes which take a more limited view of the network and provide improved network management over conventional techniques.

SUMMARY

According to one exemplary aspect, a radio network management system, having at least one centralized node is described. The at least one centralized node includes a radio transceiver having more than one adjustable parameter. The centralized node also includes at least one adaptive tuning engine configured to make changes to the at least one adjustable parameter. A weighted analysis function is configured to provide a weighted analysis based on the output of the at least one adaptive tuning engine. Further, a cognitive learning function is configured to provide feedback to make optimally directed adjustments to the at least one adaptive tuning engine.

In accordance with another exemplary aspect, a radio transceiver having more than one adjustable parameter is described. The radio transceiver is a part of a network of radio nodes. The radio transceiver includes a processing circuit. The radio transceiver also includes a program running on the processing circuit, the program includes at least one adaptive tuning engine configured to make changes to the at least one adjustable parameter. The radio transceiver further includes a weighted analysis function configured to provide a weighted analysis based on the output of the at least one adaptive tuning engine. Further still, the radio transceiver includes a cognitive learning function configured to provide feedback to make optimally directed adjustments to the at least one adaptive tuning engine.

In accordance with a further exemplary aspect, a method of communicating on a radio network of mobile radio nodes includes accessing a terrain map. The method also includes accessing data relating to the radio capabilities of at least one radio node. Further, the method includes creating a communication reach metric based on the terrain map and based on the radio capabilities. Further still, the method includes determining how long at least two radio nodes can communicate based on the communication reach metric.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Mobility in ad-hoc networked nodes causes dynamic network formation and reformations. In current literature node mobility is considered to be a random function, especially in simulations, at every instant in time. The reality is that a majority of the ad-hoc network mobility is coordinated mobility. Consider the case of a small set 200 of soldiers 210 on a reconnaissance mission, each soldier may take a different path to approach the target 220 of the reconnaissance and their individual paths may seem random if it is viewed independently but if it is viewed as a group or sub-network, a pattern of mobility emerges. This pattern can be seen only with the eyes of a centralized ad-hoc network management entity. The reality of the reconnaissance mission is that though each of the individual nodes may encounter additional friendly nodes for network formation and reformation, the mobility of the small set of soldiers will actually cause a limited number of network reformations. A network management system capable of analyzing the mobility pattern of the small set of soldiers will be able to maintain the network connectivity using a variety of techniques and reducing the impact of many external factors.

The factors that cause the limited network reformations may include, but are not limited to:
1. Terrain (shadowing, fading, multipath).
2. Individual node speed.
3. Power constraints.
4. Quality of Service (QoS) requirements.

The individual node speed determines the effectiveness of centralized ad-hoc network management. The higher the individual node speed the lesser the impact of the ad-hoc network management. This means that the ad-hoc network manager cannot behave as a static entity as in wired systems and it has to act in conjunction with auto-network management and policy based network management techniques to be effective. Auto-network management and policy based network management techniques can be used as coarse network managers and a cognitive centralized network management entity should be used for network fine tuning to improve overall network performance.

Figure 1:
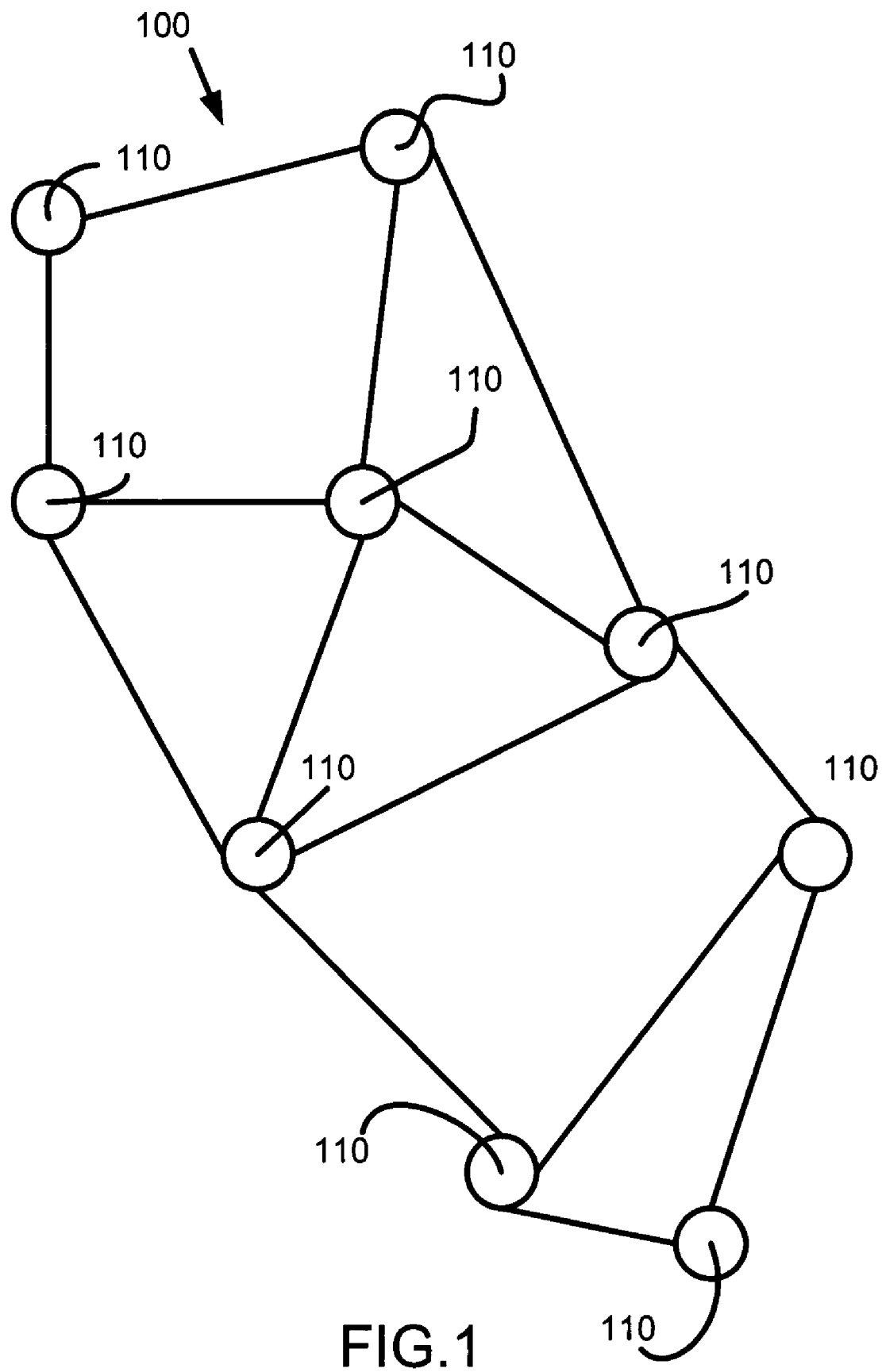
FIG. 1 is an exemplary diagram of a network of radio nodes.
Figure 2:
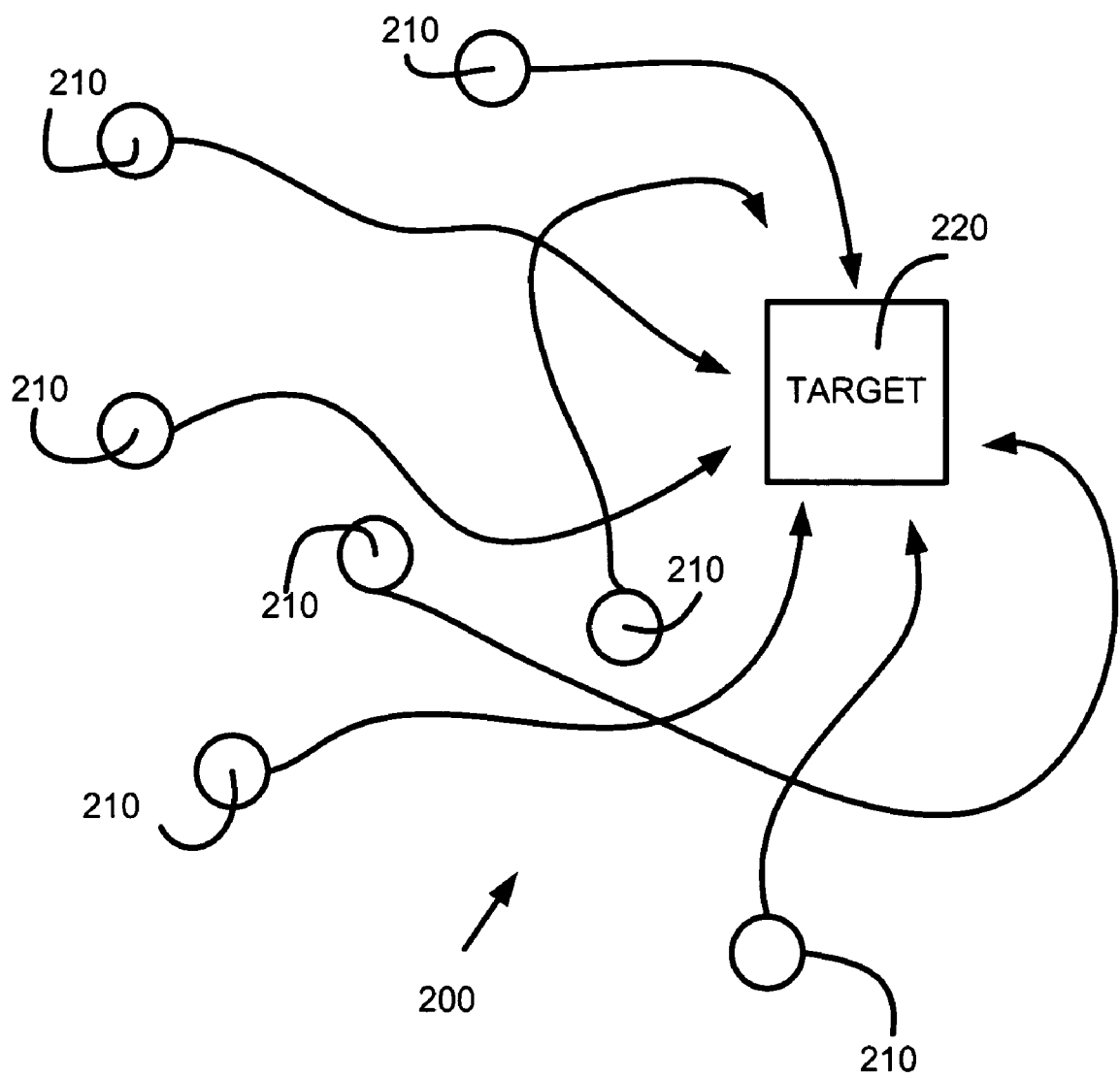
FIG. 2 is an exemplary diagram of a network of radio nodes moving toward a target.
Figure 3:
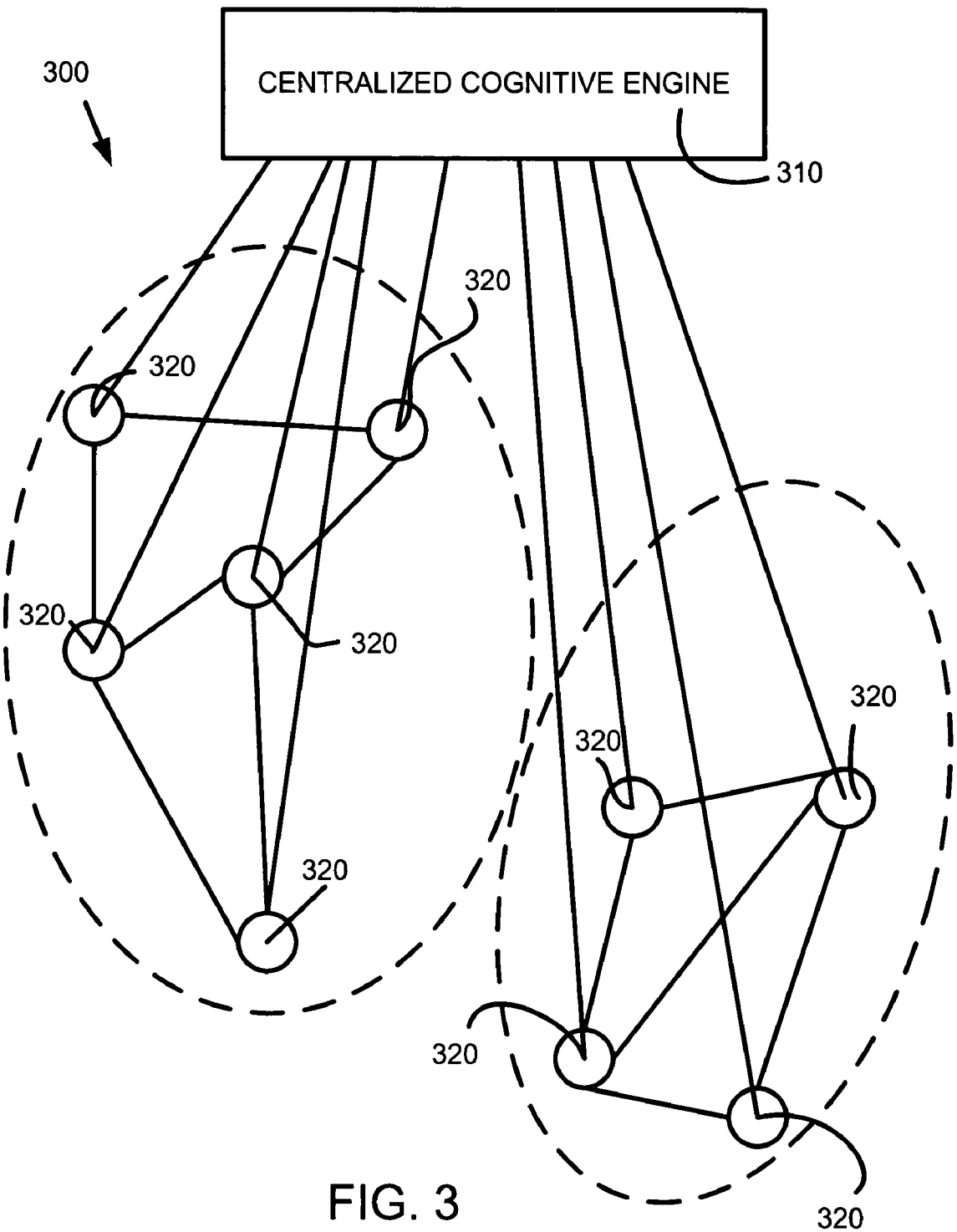
FIG. 3 is an exemplary diagram of a radio node network utilizing a centralized cognitive engine.
Figure 4:
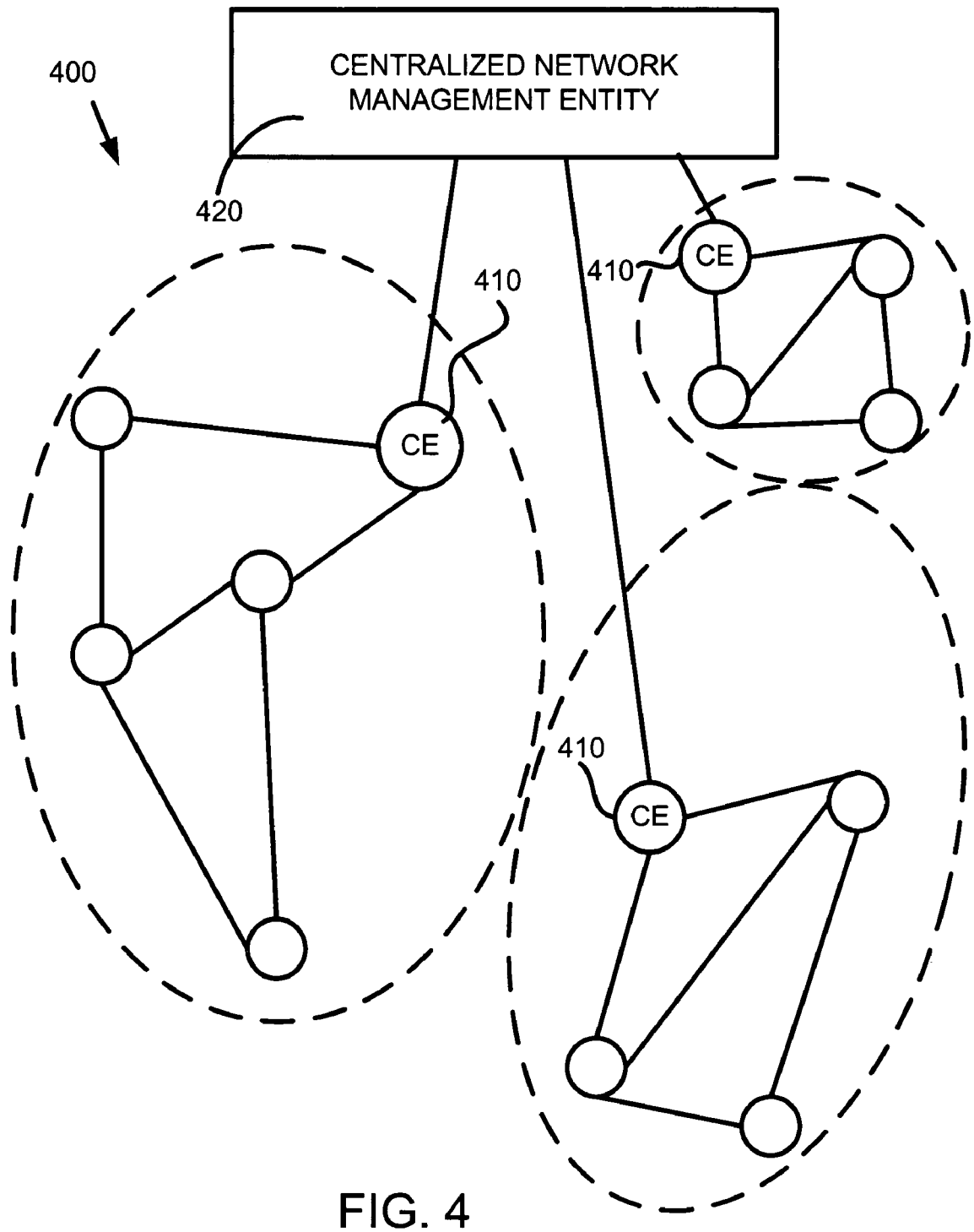
FIG. 4 is an exemplary diagram of an alternative radio node network utilizing a centralized network management entity.

Cognitive engines can be used to fine-tune the performance of a mobile ad-hoc network for different criteria. Referring to FIG. 3, cognitive engines are specialized engines that use data mining and data fusion on specific data provided by individual nodes 320 to find unique behavioral patterns that can be optimized. Since these cognitive engines are very processing intensive they have to be run on high-powered machines which are only available at the network management center. Cognitive engines need not be run at a centralized location (See FIG. 4), though a centralized cognitive engine (CE) will be more efficient in detecting and optimizing patterns. Cognitive engines 410 can be clustered hierarchically like those of a policy based network management systems with each level looking for localized optimization chances and as one goes higher up in the hierarchy the performance tends toward that of a centralized network management entity 420.

Cognitive Link Profiling Engine is an embodiment of an optimizer and fine tuning engine that can run at a network management entity. Currently individual nodes use signal strength indicators and use of "HELLO" or other equivalent ad-hoc network connectivity techniques to determine link failures. Once link failures are detected then alternative routing paths are evaluated to re-establish end-to-end connectivity. Current route management techniques have only a limited view of the network i.e. it knows about its immediate neighbors and under some circumstances its second order neighbors.

If each node can provide the network management entity with its current location at regular intervals of time, then the cognitive link profiling engine can run the following optimization engines:

1. Radio Configuration Optimization. Current military communication systems use multiple (2-6) independently configurable radios. The data rate, range, LPI/LPD capabilities etc. depend on the radio configuration. By knowing the current position of a node and that of its neighbors the profiling engine can run a series of link budget calculations for each node using a set of combinations. The radio configurations for each node are then ordered in best to worst order. The radio configuration data can then be pushed to the individual nodes so that the network can be fine-tuned. The ordered radio configuration list can also be used to select alternative radio configurations due to sudden link disruptions. This proactive manner of cognitive network management can result in less network disruptions and re-formations.
2. Radio Configuration Optimization coupled with Terrain Data. The above mentioned radio configuration technique suffers from sudden network disruptions due to terrain effects like shadowing, fading and multipath. Fading and multipath effects have to be combated locally but shadowing effects can be combated (predicted) using terrain information. Based on the position of the nodes, direction of mobility, speed and the terrain between them, the cognitive network management tool can predict link disruptions. Alternate radio configurations and/or routing table updates can be pushed to the nodes to reduce link disruptions due to terrain effect. One embodiment of the invention is to use location and terrain aware directional flooding to ensure that for the duration of the shadowing there is no route disruption. Normalized routing can be resumed as soon as the node is beyond the blockage.

If the approximate location of a communication node is known to the network management tool, it can pull up the terrain map and the different radio capabilities of the node. Based on the terrain map and possible radio configurations it can create a terrain aware "Communication Reach Metric" for each of the possible radio configurations using the appropriate propagation models and accounting for the terrain effects. By analyzing the "Communication Reach Metric" of a node with its neighbors the network management tool can predict how long the two nodes can communicate. By pushing this "nodal communication metric" from the network management tool to the nodes one can proactively handle terrain, radio and topology related communication breakdowns by using alternate routing and/or changing radio parameters (modulation, transmit power, coding, antenna type etc.).

Another embodiment of the invention is to use the terrain metric to determine which cognitive optimization engine to use. If the terrain is flat with relatively fewer obstructions then the radio configuration optimization can be used as it places a lower processing burden on both the radio nodes and the network management entity. The terrain information can also be used as an input in deciding antenna configuration (Omni, Directional, and MIMO).

3. Situation Aware Radio Configuration Optimization coupled with Terrain Data. If the network management tool can be provided details of the mission parameters then the cognitive engines have an additional aid in terms of general direction, mobility, LPI/LPD criteria. It also gains knowledge of which subset of nodes has to be always connected. Based on these additional information the cognitive engine can ignore short term positional/directional fluctuations, provide coverage outer bounds beyond which inter-nodal communications will fail.

An embodiment of the invention is to push to the individual nodes a polygon that defines the nodes communication boundaries. The areas of shadowing will be represented by a notch in the polygon where the link reach (from center to edge of polygon) is drastically reduced. Based on the nodes current position a suitable warning and alternative communication options can be presented or adopted by the radio.

Cognitive Network Topology Prediction Engine is the next layer of cognition engine that can be added to the link profile analysis. The "Communication Reach Metric" can be used by a node to determine its communication status with its neighbor and how it can use its communication arsenal more effectively to reduce network re-formations. For e.g. based on the "Communication Reach Metric" a node can determine whether a line of site communication can be maintained with a neighboring node and how to extend the line of site communication with its neighbor by using directional antennas or higher transmit power etc. The individual nodes will not be able to perform:

1. Network fragmentation analysis to predict, detect and heal network fragmentation.
2. Network capacity and throughput (QoS) analysis to detect routing bottlenecks.

In order to perform a network level resource management a network wide view is required which is not available at individual nodes. A centralized or hierarchical ad-hoc network management tool can have a network wide view to detect bottlenecks and mitigate the effects of it at an early stage. In order to perform these predictions the following information has to be available at the network management tool:

a. Node's processing capability.
    b. Node's battery status.
    c. Node's queue and buffer status.
    d. Node's average transmit power.

The cognitive network management tool can run a queue and buffer analysis of all nodes in a geographic location and identify nodes with high queue and low buffer status. Identification of nodes with high queue and low buffer status is useful in predicting routing latencies. On detecting burdened nodes the cognitive network management can analyze a combination of radio configurations and topology modifications (routing table) that will spread the load evenly. The new radio configurations and routing tables can be pushed to the specific nodes to balance the routing and forwarding load. Latency tuning can performs analysis of queue, buffer, and applications; based on concept of operations and mission parameters, to identify bottlenecks and provide potential solutions without human intervention.

The cognitive network management tool can run a battery state analysis of all nodes in a geographic location and create a battery status map. On detecting burdened nodes the cognitive network management can analyze a combination of radio configurations and topology modifications (routing table) that will spread the load evenly. The new radio configurations (using lower modulation schemes, reduced coding overhead, and use of directional antennas) and routing tables can be pushed to the specific nodes to balance the routing and forwarding load for battery life enhancement. Power Consumption tuning performs analysis of per node battery status and power consumption based on mission duration, concept of operations and mission parameters to identify and anticipate localized excessive power drainage failures and suggest alternative routing, modulation, radio link usage, topology reorganization solutions that can mitigate or eliminate these failures without human intervention.

The cognitive network management tool can run a radio resource analysis of all nodes in a geographic location and create a radio resource utilization map. Since military communication systems employ multiple individually configurable radios (modulation, coding and antenna) network level radio resource analysis using cognitive data mining and fusion techniques can identify performance bottlenecks, failures and potential failures due to non-optimal use of radio resources.

Many a time the proximity or positioning of a node within a network causes specific network flows which drain resources and create bottleneck in the network. Smart cognitive engines can determine flow localization due to location and dynamically redistribute the flow by artificially adjusting topology or other resource usage to minimize flow interruptions due to localized resource misuse without human intervention. This is also useful in identifying greedy nodes, malicious nodes, denial of service attempts etc.

The advent of cognitive communication is slowly revolutionizing the wireless communication industry. Use of cognitive models (centralized and/or distributed) for aiding the communication system to adapt to the changing requirement of wireless communication is becoming a necessity. The following cognitive models are an example of possible cognitive models to be applied in a communication system:

1. Situation Aware Cognitive Application model—One of the biggest issues in military missions is that information is provided on a need to know basis. This means there can be a secret mission in progress that only a subset of the personnel are aware of, yet the communication resources of the entire personnel in the vicinity is common. Thus, it is not uncommon for some personnel not associated with the ongoing mission to attempt to watch a streaming news video clip draining valuable communication resources from the mission in progress. This requires that communication equipment have a cognitive application model running in the background that has been notified of a communication resource moratorium. The mission commander can enter the communication resource needs and a geographic location at the network management system. The network management system identifies all communication devices in the immediate vicinity (not connected with the mission) capable of draining the communication resource and informs the cognitive application model residing in the radio. The application model then initiates a bandwidth shaping application that filters/throttles all unconnected traffic to the radio from using the specified resources in the specified geographic location.

2. Game Theory Based Cognitive Traffic Shaping Model—The Situation Aware Cognitive Application Model specified above is more of a load balancing model than a cognitive one as the throttling is done independent of the knowledge whether sufficient bandwidth exists to support non-critical traffic in conjunction with critical traffic. What is required is a cooperative traffic sharing model where each node perceives the effect of traffic in the spectrum and adjusts its game strategy (each node is a player in a multiplayer game) to achieve a Nash Equilibrium. The end result is all terminals get fair use of the traffic pie. Nodes with critical mission parameters that use more than their share of the traffic appear as a friendly greedy node that has been permitted the temporary greedy behavior. Nodes that are not programmed (authorized by configuration, mission parameters, policy distribution) to use greedy behavior have to ensure that the traffic they are going to introduce will not disturb the Nash Equilibrium thereby forcing all terminals to reevaluate their traffic strategy.

Figure 5:
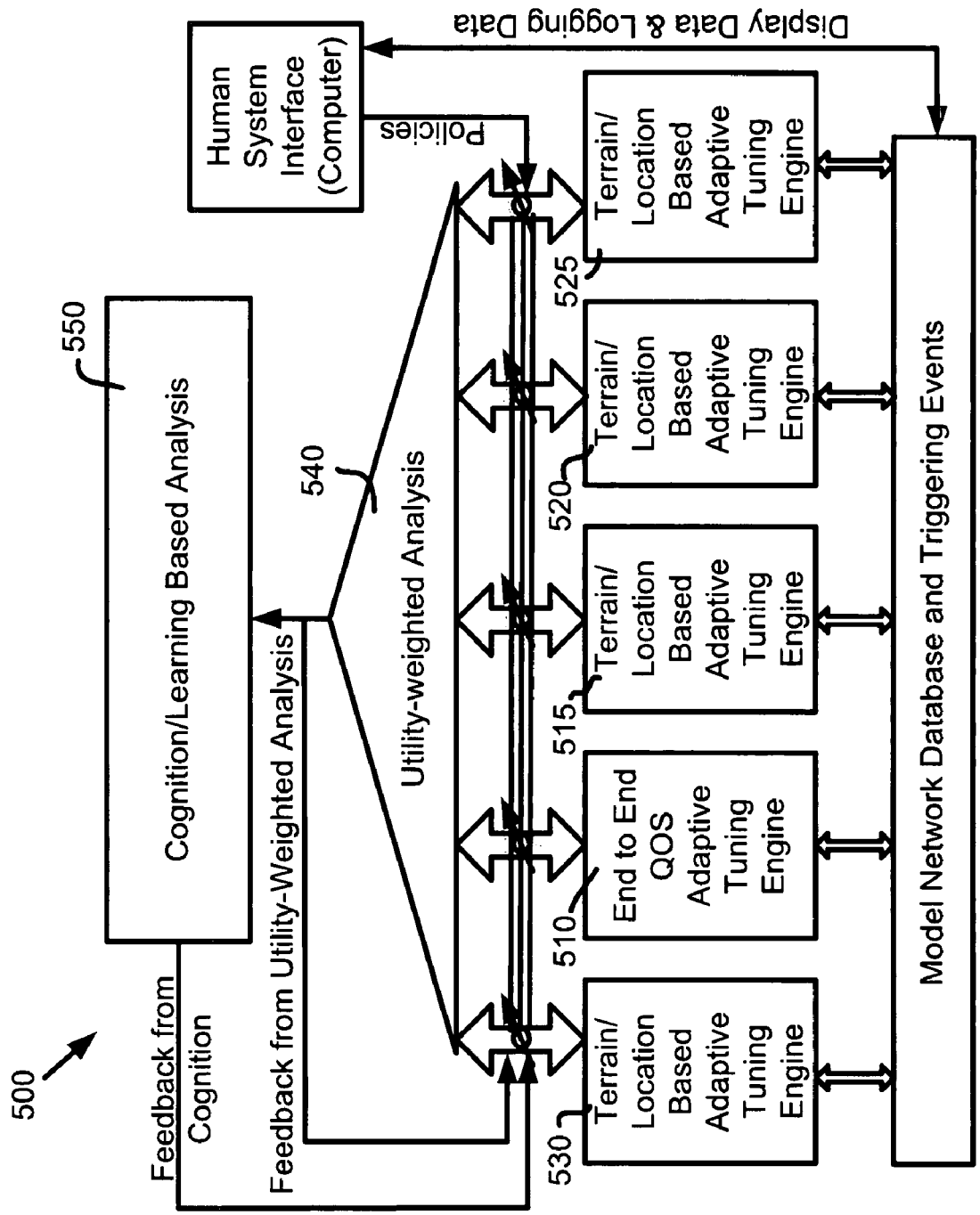
FIG. 5 is an exemplary block diagram of a radio network node integrated into a radio network system.

The goal of the Cognitive Network Management System (CNMS) is to drive "hands on time" to zero while using a minimum of network management functions for communicating and efficiently using network resources with minimal operator intervention. To meet this goal CNMS 500, as illustrated in FIG. 5, may feature adaptive tuning engines 510, 515, 520, and 525 supported by conditional, secure policy management across the three phases of network management (system configuration, operations, and maintenance and analysis). The tuning engines could be the following but are not limited to these:

Spectrum usage, link budget and terrain-aware topology tuning engine 510.
    Radio Resource Aware (modulation, coding, antenna, queue, mobility) tuning engine 520.
    Network Level QoS performance tuning engine 515.
    Terrain based Tuning Engine 530.

Independent intelligent adaptive tuning engines for management of different aspects of the network may be created, an adaptive weighting algorithm 540 may be used and finally a cross-functional cognition engine 550 may be used to support an integrated configuration and situation aware management system.

Each tuning engine will have multiple adaptation scenarios and triggers for activation and deactivation. The CNMS will have autonomous or controlled mechanisms to define these triggers and their activation/deactivation conditions. A similar scenario and trigger mechanism will be employed for automatic control of information display. The configurations determine the level of data fusion and visualization to be employed to dynamically adjust the information and content presented.

One embodiment of the invention is to use weighted-compound decision making to order relative importance of tuning engines (pre-determined, user preference, past usage history, cognitively) to make optimal decisions to prevent the impact of one tuning engine adjustment from negating the effect of another tuning engine.

The adaptive tuning engines and decision weighting logic can also be improved by the addition of a cross-functional cognitive behavior layer. A standardized cognition language will be integrated to ensure inter-operability and ease of secure mission-based policy configuration, distribution and enforcement.

The advantage of the framework described is that it can be used in various systems. It is flexible enough to be used as a full-fledged cognitive engine or as a combination of adaptable and cognitive options to suit the mission requirements.

Figure 6:
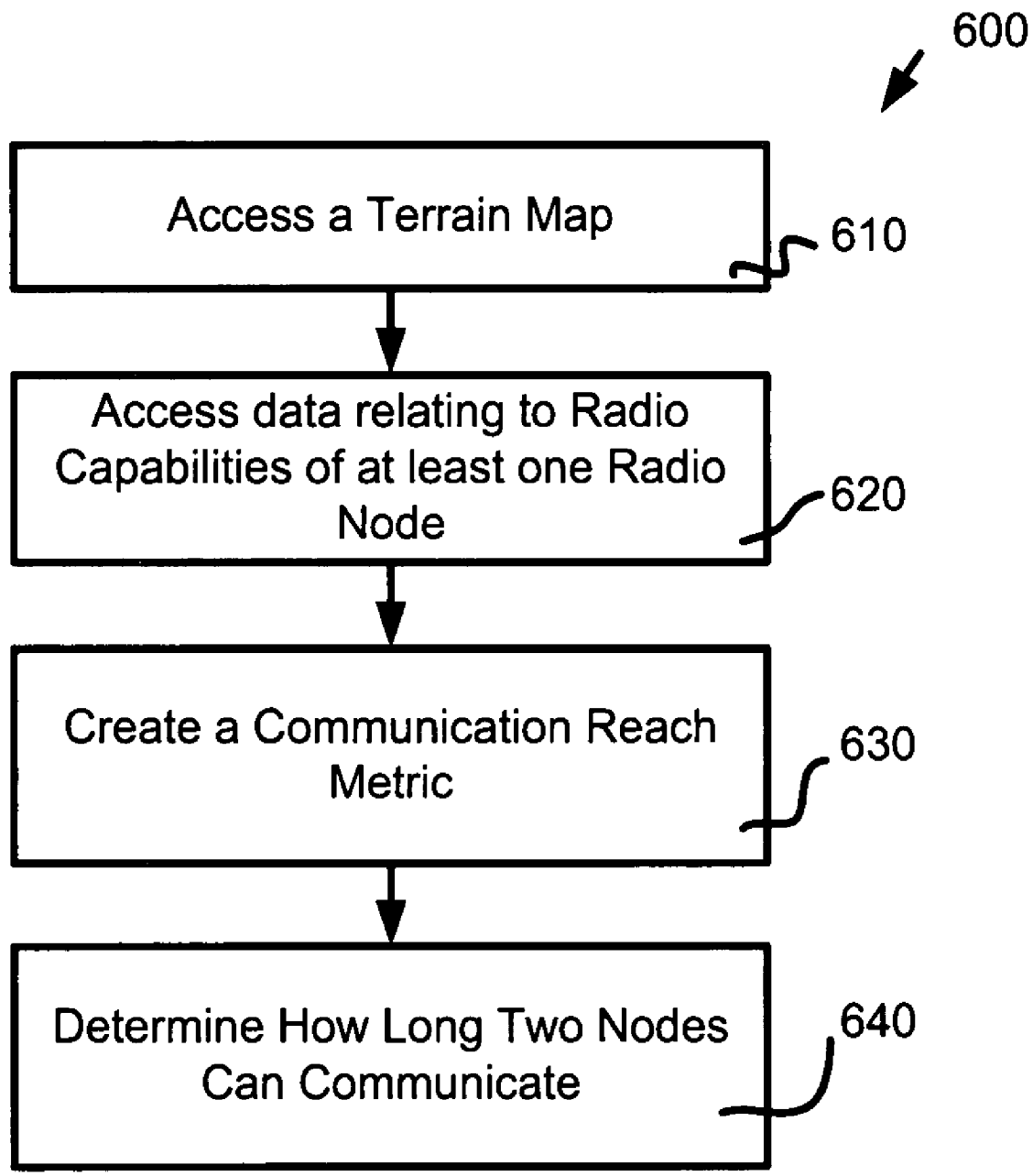
FIG. 6 is an exemplary process diagram of a communication process in accordance with an exemplary embodiment.

In accordance with an exemplary embodiment, a method 600 (depicted in FIG. 6) enables communicating on a radio network of mobile radio nodes. The method includes accessing a terrain map in order to make determinations about the terrain and potential obstructions (process 610). The method also includes accessing data relating to the radio capabilities of at least one radio node (process 620) in order to determine possible configurations for the radio nodes. Further, the method includes creating a communication reach metric (process 630) based on the terrain map and based on the radio capabilities. The communication reach metric then may be used to determine how long at least two radio nodes can communicate based on the communication reach metric (process 640).

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio network management system, having at least one centralized node, the at least one centralized node comprising:
    a radio transceiver having a plurality of adjustable parameters;
    a plurality of adaptive tuning engines configured to make changes to the adjustable parameters, the plurality of adaptive tuning engines including a terrain-aware topology tuning engine;
    a weighted analysis engine configured to provide a weighted analysis based on the outputs of the adaptive tuning engines, the weighted analysis prioritizing the adaptive tuning engines based on relative importance of the adaptive tuning engines; and
    a cognitive learning engine configured to provide feedback to make optimally directed adjustments to the plurality of adaptive tuning engines, wherein the cognitive learning engine is configured for providing feedback to the terrain-aware topology tuning engine based on terrain information for allowing the system to predict link disruptions based on said terrain information, the cognitive learning engine including a situation aware cognitive application model, the situation aware cognitive application model being configured for initiating a bandwidth shaping application for filtering unconnected traffic to the node from using specified resources in a specified geographic location.

2. The radio network management system of claim 1, wherein the cognitive learning engine comprises a game theory based cognitive traffic shaping model.

3. The radio network management system of claim 1, wherein the cognitive learning engine comprises a queue and buffer analysis of network radio nodes within a geographical location.

4. The radio network management system of claim 1, wherein the cognitive learning engine comprises a battery state analysis of network radio nodes within a geographical location.

5. The radio network management system of claim 1, wherein the cognitive learning engine comprises a radio resource analysis of network radio nodes within a geographical location.

6. The radio network management system of claim 1, wherein the cognitive learning engine comprises a flow localization analysis of network radio nodes within a geographical location.

7. A radio transceiver having a plurality of adjustable parameters, the radio transceiver being part of a network of radio nodes, comprising:
    a processing circuit; and
    a program running on the processing circuit, the program including:
        a plurality of adaptive tuning engines configured to make changes to the adjustable parameters, the plurality of adaptive tuning engines including a terrain-aware topology tuning engine;
        a weighted analysis engine configured to provide a weighted analysis based on the outputs of the adaptive tuning engines, the weighted analysis prioritizing the adaptive tuning engines based on relative importance of the adaptive tuning engines; and
        a cognitive learning engine configured to provide feedback to make optimally directed adjustments to the adaptive tuning engines, wherein the cognitive learning engine is configured for providing feedback to the terrain-aware topology tuning engine based on terrain information for allowing the system to predict link disruptions based on said terrain information, the cognitive learning engine including a situation aware cognitive application model, the situation aware cognitive application model being configured for initiating a bandwidth shaping application for filtering unconnected traffic to the radio transceiver from using specified resources in a specified geographic location.

8. The radio transceiver of claim 7, wherein the cognitive learning engine comprises a game theory based cognitive traffic shaping model.

9. The radio transceiver of claim 7, wherein the cognitive learning engine comprises a queue and buffer analysis of network radio nodes within a geographical location.

10. The radio transceiver of claim 7, wherein the cognitive learning engine comprises a battery state analysis of network radio nodes within a geographical location.

11. The radio transceiver of claim 7, wherein the cognitive learning engine comprises a radio resource analysis of network radio nodes within a geographical location.

12. The radio transceiver of claim 7, wherein the cognitive learning engine comprises a flow localization analysis of network radio nodes within a geographical location.

* * * * *